Dec. 7, 1965  S. MUNCK  3,221,668
ARRANGEMENT BY GANTRY CRANE
Filed Aug. 19, 1963

INVENTOR
SVERRE MUNCK
BY Larson and Taylor
ATTORNEYS

United States Patent Office 3,221,668
Patented Dec. 7, 1965

3,221,668
ARRANGEMENT BY GANTRY CRANE
Sverre Munck, Bergen, Norway
Filed Aug. 19, 1963, Ser. No. 303,078
Claims priority, application Norway, Sept. 5, 1962,
145,618; Nov. 10, 1962, 146,387
4 Claims. (Cl. 105—29)

The invention relates to gantry cranes of the type which can be moved on wheels along suitably placed rails. The invention especially relates to ship gantry cranes of the type where the crane can be moved along the ship on rails fastened to the deck on both sides of the loading hatches.

The movement of previously known gantry crane constructions has been effected by aid of drive gears which are arranged on a horizontal shaft and which are in engagement with the vertical gear teeth of a rack gear fastened to the deck or the like. Such a drive transmission has the disadvantage that the engagement between the gears and the toothed wheel must be very accurately adjusted. If the engagement is too tight, the gears, instead of the wheel and the rail, may come to carry the whole or a substantial part of the weight of the gantry crane. If the engagement is too loose, there is no such undesirable stress on the gears and the rack, but there will be a clearance in the engagement which results in poor power transmission. Thus in the first case one gets an undesirable stress on the construction parts of the crane, and in the last case a bad driving of the crane.

To avoid these disadvantages it is suggested according to the invention to arrange a rack whose teeth run vertically. A corresponding gear, the shaft of which stands in a vertical position, is then arranged on the crane. There is however no objection to the shaft having another position than the vertical, providing that the gears are conical gears or have another shape that enables the teeth to come in engagement with the vertical teeth of the rack.

By the arrangement according to the invention automatic compensation is had for unevenness and wear, as the teeth of the gear can glide freely along the vertical teeth of the rack, while the engagement is always secure.

According to a further feature of the invention it is suggested that the rack is fastened to or made integral with a bracket which at the same time supports the rail. Eventually the rails themselves may be made integral with the bracket, whereby the rack, the bracket and the rail constitute a unit. Any unevenness or bend of the base at certain areas of the rail will thus automatically cause a corresponding change in position of the rack, and good engagement between the gear and the rack is further secured.

For a secure guiding of the crane in relation to the rails it is further suggested that the crane wheels instead of being provided with guide flanges, or in addition to these, be provided with vertical guide rollers resting against both sides of the rail. Thereby is obtained an accurate guide of the crane along the rails, so that the displacement of the crane in the horizontal plane in relation to the rails in negligible. Such guide rollers may be provided on each of the wheels of the crane.

The rack and associated driving gears are preferably arranged only on one side of the gantry crane, while on the other side there are only the rails and supporting wheels with guide rollers.

It is further an object of the invention to provide arrangements by such moveable gantry cranes onboard ships, whereby the cranes can be effectively locked to the deck when they are out of use. This locking is effected in such a way that the wheels and the drive transmission means of the crane are not damaged by the forces that they would otherwise have been submitted to because of the movements of the ship in the sea.

It is a further feature of a gantry crane according to the invention that in addition to the ordinary brakes on the motors it is advantageously provided with rail brake on each side of the crane bridge, which brakes are automatically lifted when the driving machinery is started, and automatically lowered into working position to hold the crane still as soon as said machinery stops. The braking means itself may be of a kind known per se, hydraulically or electrically worked and connected to the driving machinery.

The above as well as further characterizing features of the invention will appear more clearly from the following description of some embodiments of details regarding gantry cranes of the said type. These embodiments are shown schematically in the drawing, and it will further be understood that they are only meant to illustrate the inventive idea without limiting the protection to these special embodiments. Several modifications of the details shown will be apparent to one skilled in the art and shall fall within the frame of the invention.

Figure 1:
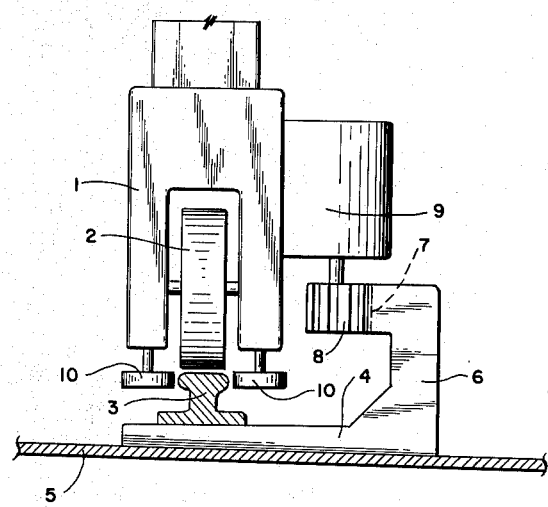
FIG. 1 shows the lower part of a corner of the gantry crane frame with associated wheels and rail support as well as driving means.

In FIG. 1 the lower part of the crane frame, which supports a wheel, is at each of the corners of the crane marked 1, and the freely pivoted wheel is indicated by 2. The rail 3 on which the wheel is rolling, is fastened to the deck 5 on base plates which in the example shown are made integral with rising brackets 6 which on top carry a vertical rack 7.

The rack 7 is in engagement with the drive gears 8 on the shaft of the drive motor indicated by 9.

The crane wheels 2 are in the example shown arranged without guide flanges and are kept in place on the rail 3 by aid of guide rollers 10 freely and rotatably mounted on vertical shafts that extend from the crane frame 1. It will immediately be seen that the arrangement shown permits automatic compensation for unevenness and wear, as the teeth on the gear 8 can slide freely in vertical direction along the teeth on the rack with permanent and secure engagement. By making the support 4 of the rail 3 integral with the brackets 6 of the rack. Any unevenness or bend in the base at certain areas of the rail will thus automatically give rise to a corresponding change in position of the rack, whereby a good engagement between the drive means is achieved under all conditions.

The arrangement shown of the guide rollers 10 will secure precise steering of the wheel 2 on the rail 3 and further cause a full and effective engagement between the gear 8 and the rack 7 at any time.

To make sure that the described details are not exposed to undesirable or destructive stress by the movement of the ship in the sea, it is, as mentioned above, suggested that suitable locking means be arranged at each corner of the crane.

Figure 2:
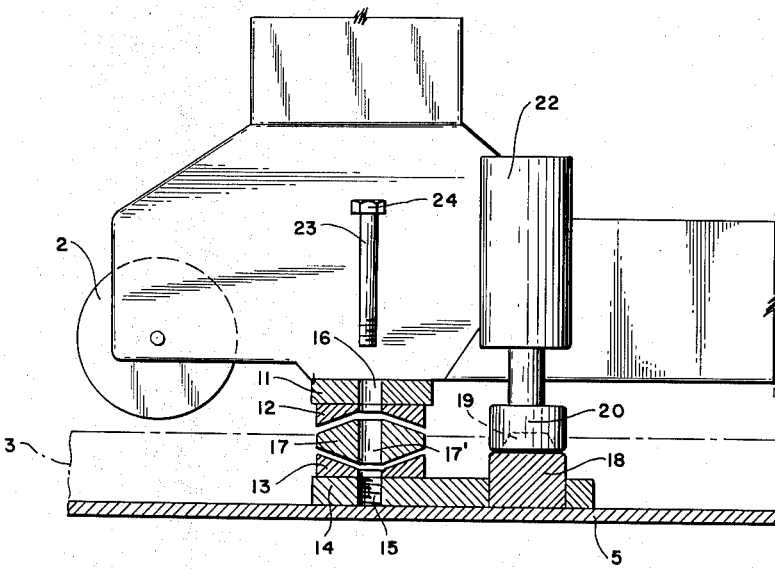
FIG. 2 shows a right side view, partially in section, of FIGURE 1.

FIG. 2 shows an example of such as locking device. The crane frame 1 is provided with a vertically extending support part 11 adjacent wheel 2. This part is provided underneath with a conical seat 12. At a suitable location on the deck 5 there is arranged a support plate 14 or the like, fastened to the deck in a suitable way, e.g., by welding. The support plate 14 is provided on top with a conical seat 13 which corresponds to the seat 12.

Very close to the described arrangement there is a jack 21, 22 whose piston head 20 can work against a suitable resting block 18 which may advantageously be a part of the base construction 14 on the deck 5.

Through the part 11 on the crane frame and in the base plate 14 there is a vertical bore which in the plate 14 is threaded as indicated by 15.

When the crane is working, the piston head 20 is lifted and the described parts thus do not touch one another, so that the crane can drive freely along the rail 3.

When the crane is to be locked in stowed position, the crane frame part 11 is brought to a position above the base plate 14 with the bores 15 and 16 in co-axial position. Pressure oil is fed to the jack 21, 22, and when the piston head 20 bears on the resting block 18, the jack lifts the crane so that the wheel 2 is lifted up from the rail 3. The gear 8 can then slide in vertical direction in relation to the rack 7 because of the described mode of construction. The cooperating surfaces between the piston head 20 and the resting block 18 are preferably hemispherical or conical as indicated by the dotted line 19. An unprecise adjustment of the bores 15 and 16 in coaxial position will then automatically be compensated by the oblique surfaces between the parts 18 and 20 pulling the crane into right position.

When the crane is lifted from the rail as described by aid of the jack, a filling block 17 is inserted between the seats 12 and 13. This filling block can be of a suitable material and has a double conical shape corresponding to the described seats 12 and 13. A smooth bore 17′ goes centrally through the filling block.

When the filling block 17 is inserted, the crane is lowered by relieving the jack, and all the weight of the crane will then rest on each corner of the described support parts, between which the filling block 17 is placed. The arrangement is adapted so that when the crane is lowered to be supported by these means, the wheel 2 is still raised a little above the rail 3. Because of the conical shape, the crane is accurately localized in relation to the deck, so that neither the guide rollers 10 nor the transmission means 7, 8 of the driving means can be damaged.

To lock the crane to the deck, so that it cannot capsize when the boat is rolling hard, a bolt 23 is passed through the bores 16, 17′ and 15, and is screwed with its lower threaded end into the threads 15 of the support plate 14. The head 24 of the bolt is then resting against the top side of the part 11 at the crane frame, and secures a solid anchorage of the crane to the deck.

I claim:

1. In combination with a gantry crane on a ship having drive means comprising gantry support legs, a support plate mounted on the ship deck and generally disposed along the path of movement of the legs on one side the gantry crane, a rail integral with the support plate and disposed to cooperate with at least one wheel rotatably secured to each leg of said crane, a rack integral with said support plate and having the gear teeth thereof disposed vertically with respect to the ship deck, drive means comprising a pinion mounted on a support leg to engage with said rack to move the gantry along said rail, means to restrain said wheel from moving transversely of said rail, jack means for lifting each leg of the crane, and means to secure the crane in a stowed position wherein the wheels are raised free of the rails comprising a seat secured to each leg and spaced above a second seat secured to the ship deck and a filling block insertable between the first and second seats when the corresponding leg is raised by said jacks.

2. In combination with a gantry crane on a ship, means to secure the crane in a stowed position according to claim 1 wherein the first and second seats and the block are each correspondingly conical.

3. In combination with a gantry crane on a ship, means to secure the crane in a stowed position according to claim 1 wherein the first and second seats and the filling block are each provided with a central aperture to receive a locking bolt.

4. In combination with a gantry crane on a ship, jack means according to claim 1 comprising a piston head and cooperating block secured to the ship deck each having corresponding conical engagement surfaces.

References Cited by the Examiner

UNITED STATES PATENTS

| | | | |
|---|---|---|---|
| 465,491 | 12/1891 | Osborne | 104—247 |
| 597,287 | 1/1898 | Hurst | 104—247 X |
| 1,094,026 | 4/1914 | Simmonds | 104—34 |
| 1,341,249 | 5/1920 | Widergren. | |
| 1,503,999 | 8/1924 | Sheal | 105—29 |
| 1,728,726 | 9/1929 | Fink | 105—29 |

MILTON BUCHLER, *Primary Examiner.*

ARTHUR L. LA POINT, EUGENE G. BOTZ,
*Examiners.*